(12) United States Patent
Henderson

(10) Patent No.: US 12,138,573 B2
(45) Date of Patent: Nov. 12, 2024

(54) PLEATED FILTER MEDIA ASSEMBLY

(71) Applicant: Michael Henderson, Grass Valley, CA (US)

(72) Inventor: Michael Henderson, Grass Valley, CA (US)

(*) Notice: Subject to any disclaimer, the term of this patent is extended or adjusted under 35 U.S.C. 154(b) by 338 days.

(21) Appl. No.: 17/590,662

(22) Filed: Feb. 1, 2022

(65) Prior Publication Data

US 2022/0355234 A1 Nov. 10, 2022

Related U.S. Application Data

(60) Provisional application No. 63/120,041, filed on Dec. 1, 2020.

(51) Int. Cl.
*B01D 46/52* (2006.01)
*B01D 46/121* (2022.01)
*B01D 46/58* (2022.01)

(52) U.S. Cl.
CPC ......... *B01D 46/523* (2013.01); *B01D 46/121* (2022.01); *B01D 46/58* (2022.01); *B01D 2265/06* (2013.01); *B01D 2267/30* (2013.01)

(58) Field of Classification Search
CPC .... B01D 46/523; B01D 46/58; B01D 46/121; B01D 2265/06; B01D 2267/30; B01D 46/521; B01D 46/0005; B01D 29/07; B01D 29/012; B01D 46/0001; B01D 46/0002; B01D 46/0016; B01D 2201/127; B01D 29/232; B01D 2201/12; B01D 2201/0415; B01D 2265/028; B01D 35/30; Y10S 55/31

USPC ..................................... 55/497, 490
See application file for complete search history.

(56) References Cited

U.S. PATENT DOCUMENTS

| | | | | |
|---|---|---|---|---|
| 4,689,055 A | * | 8/1987 | Kochan | B01D 46/523 |
| | | | | 95/279 |
| 6,074,450 A | * | 6/2000 | Raber | B01D 46/523 |
| | | | | 55/497 |
| 2003/0070406 A1 | * | 4/2003 | Duffy | B01D 35/30 |
| | | | | 55/497 |

* cited by examiner

*Primary Examiner* — Robert A Hopkins
*Assistant Examiner* — Qianping He
(74) *Attorney, Agent, or Firm* — Barry Choobin; Patent 360

(57) ABSTRACT

An assembly for pleating a filter media sheet and using the assembly with a pleated filter media as a filter for filtration units. The assembly includes a male member and a female member. The male member includes several pleat ridges arranged in rows and columns and the female member includes several pleat valleys arranged in rows and columns. The filter media sheet can be placed over the female member and a last column of pleat ridges can be gently pressed over a first column of pleat valleys, such that the first column is within the last column, respectively. The step can be repeated incrementally till the last column of the pleat ridges is within the last column of the pleat valleys progressively forming a pleated filter media sandwiched between the male member and the female member.

11 Claims, 4 Drawing Sheets

PLEATED FILTER MEDIA ASSEMBLY

CROSS-REFERENCE TO RELATED APPLICATIONS

This application claims priority from the U.S. provisional patent application Ser. No. 63/120,041 filed on Dec. 1, 2020, which is incorporated herein by reference in its entirety.

FIELD OF INVENTION

The present invention relates to an assembly for a pleated filter media, and more particularly, the present invention relates to an assembly to pleat a filter media and encase the pleated filter media.

BACKGROUND

Pleated filter media are popular because of the increased filtering efficiency in comparison to a sheet of filter media. The surface area of filter media can be increased by pleating a sheet of said media without the need to increase the size of the housing of a filtration unit.

To manufacture the pleated filter media, a porous sheet of filter media is pleated by specialized machines. The pleated filter media is then encased within a frame that maintains the shape of the pleated media. The frames with pleated filter media are commercially available that can be installed in a housing of a filtration unit. For example, the air filtration unit of a vehicle can have a housing that can receive the frame with encased pleated filter media. The size and shape of the frame can be according to the shape and size of the housing of the filtration unit. The housing of the filtration units generally varies in shape and size from one model to another, and also among different manufacturers. This increases the cost of the filter, including replacements. Besides cost, there is a wastage of materials of the frame, also polluting the environment.

Thus, a need is appreciated for a novel assembly that can overcome the aforesaid drawbacks with known pleated filters but has all the advantages of the pleated filter media.

Herein, the term filter refers to a pleated filter media encased in a frame.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a progressive pleat forming assembly that can be used as a filter in filtration units.

It is another object of the present that the assembly can decrease the cost of replacing the filters.

It is still another object of the present invention that the assembly can be reused.

It is yet another object of the present invention that any porous filter media sheet can be used in the described assembly.

An assembly for pleating a filter media sheet and using the assembly with a pleated filter media as a filter for filtration units. The assembly includes a male member and a female member. The male member includes several pleat ridges arranged in rows and columns and the female member includes several pleat valleys arranged in rows and columns. The filter media sheet can be placed over the female member and a last column of pleat ridges can be gently pressed over a first column of pleat valleys, such that the first column is within the last column, respectively. The step can be repeated incrementally till the last column of the pleat ridges is within the last column of the pleat valleys progressively forming a pleated filter media sandwiched between the male member and the female member.

In one aspect, disclosed is a pleated filter media assembly comprising a male member and a female member. The male member includes a base plate; an intake aperture configured for receiving fluid; and a plurality of pleat ridges that extends downward, the plurality of pleat ridges is arranged in rows and columns. The female member includes a front wall and a rear wall; a plurality of projections extends upwards and are arranged in rows and columns, wherein the rows run between the front wall and the rear wall, wherein two adjacent projections of the plurality of projections in the rows form a plurality of pleat valleys, wherein the plurality of pleat ridges and the plurality of pleat valleys are so arranged such that when the male member is mounted over the female member, the plurality of pleat ridges are received within the plurality of pleat valleys respectively; and an output aperture for the fluid to pass through.

In one implementation of the pleated filter media assembly, the pleated filter media assembly further comprises a filter media sheet sandwiched between the plurality of pleat valleys and the plurality of pleat ridges. The intake aperture is in the base plate. The pleated filter media assembly comprises two output apertures in the rear wall of the female member. The pleated filter media assembly is configured to be installed in a housing of an air filtration unit. Two rows of the plurality of projections form two side walls of the female member. The plurality of pleat ridges comprises thirty-two pleat ridges arranged in four rows and eight columns.

In one aspect, disclosed is a filtration unit comprising a pleated filter media assembly, the pleated filter media assembly comprises a male member and a female member. The pleated filter media assembly further comprises a filter media sheet sandwiched between the plurality of pleat valleys and the plurality of pleat ridges. The filtration unit further comprises a housing encasing the pleated filter media assembly, wherein the pleated filter media assembly is dimensioned to be encased within the housing; an intake plenum in fluid communication with the intake aperture; and an output plenum in fluid communication with the output aperture.

In one aspect, disclosed is a method for progressive pleating a filter media sheet, the method comprising the steps of providing a pleated filter media assembly, and pleating a filter media sheet using the male member and the female member, wherein the filter media sheet is sandwiched between the male member and the female member. The step of pleating the filter media sheet comprises placing the filter media sheet over the female member; inserting a last column of pleat ridges of the plurality of pleat ridges within a first column of pleat valleys of the plurality of pleat valleys such that a portion of the filter media sheet is drawn by the last column of pleat ridges into the first column of pleat valleys to form a first pleat; upon forming the first pleat, inserting a second last column and the last column of pleat ridges of the plurality of pleat ridges, simultaneously, into a second column and the first column of the pleat valleys of the plurality of pleat valleys respectively, forming a second pleat; and upon forming a second last pleat, inserting, simultaneously, the plurality of pleat ridges within the plurality of pleat valleys forming a pleated filter media sandwiched between the male member and the female member. The method further comprises the steps of mounting the pleated filter media assembly within a housing of a filtration unit, wherein the pleated filter media is sandwiched between the male member and the female member. The pleated filter media forms a screen between the intake aperture and the output aperture, such that a fluid can pass from the intake aperture to the output aperture only through the pleated filter media.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

The accompanying figures, which are incorporated herein, form part of the specification and illustrate embodiments of the present invention. Together with the description, the figures further explain the principles of the present invention and to enable a person skilled in the relevant arts to make and use the invention.

Figure 1:
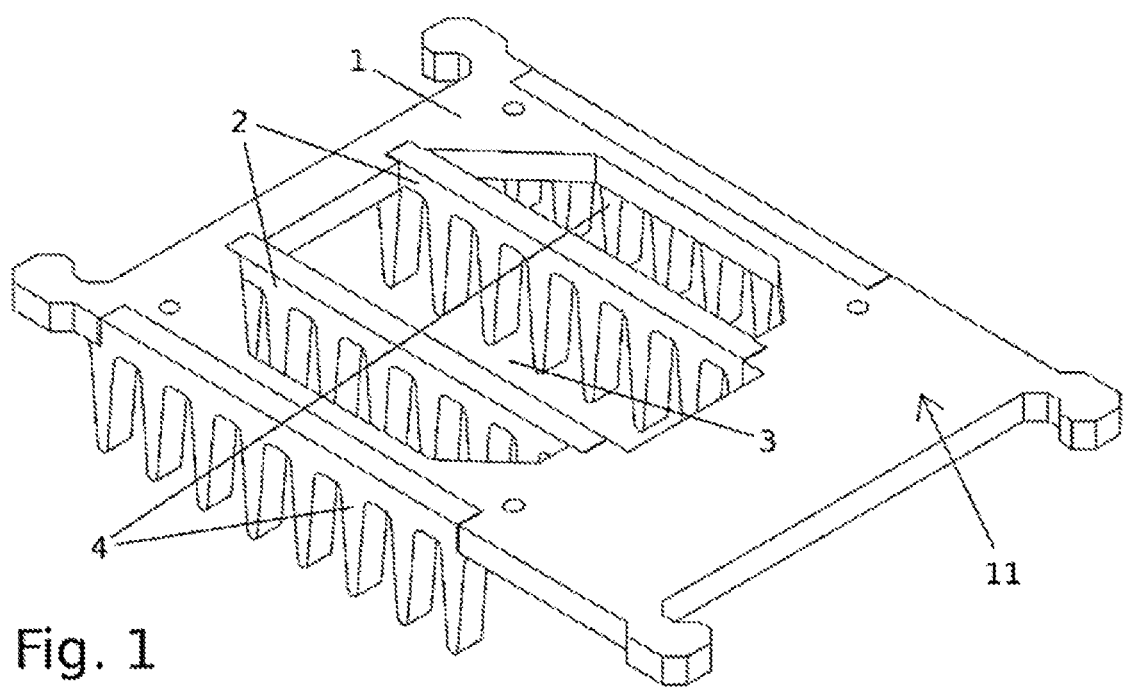
FIG. 1 is an isometric view of a male member of the assembly, according to an exemplary embodiment of the present invention.
Figure 2:
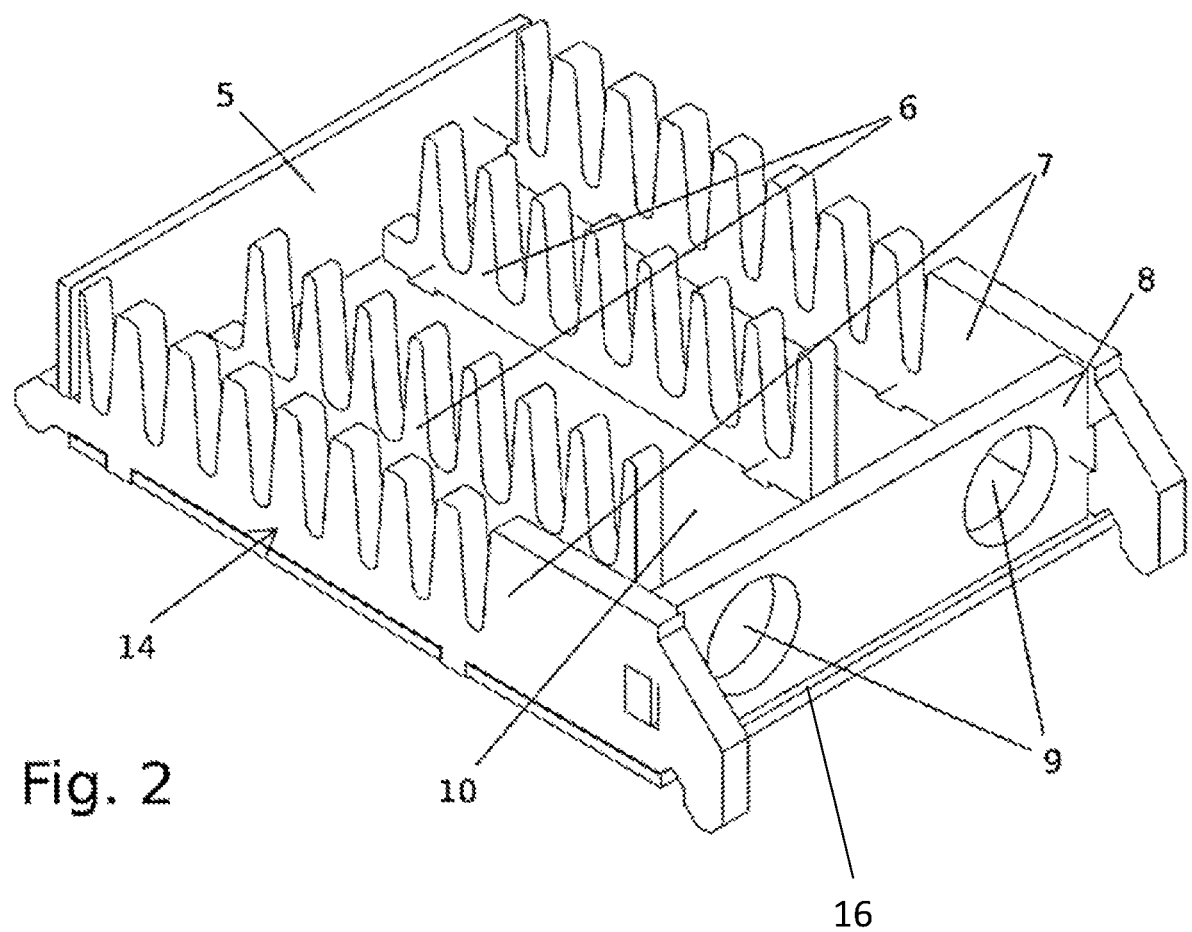
FIG. 2 is an isometric view of the female member of the assembly, according to an exemplary embodiment of the present invention.

Disclosed is an assembly for filtration units, such as air filtration units in vehicles. The assembly can be installed in a housing of an air filtration unit and provides for filtering the fluids, such as air. Referring to FIGS. 1 and 2, the assembly has a male member 11 shown in FIG. 1 and a female member 14 shown in FIG. 2. The male member 11 can have a base plate 1 that can define an upper shape of the assembly, wherein the shape of the assembly can be according to the shape of the housing of the filtration unit into which the assembly shall fit. The base plate 1 can have an enlarged intake aperture 3 for intaking fluids for filtration, such as air. For example, the intake plenum of the filtration unit can be in fluid communication with the intake aperture. The size and shape of the intake aperture can be varied without departing from the scope of the present invention. The male member 11 can further include several downward projections as pleat ridges that are arranged in rows and columns. FIG. 1 shows four rows 2 of the pleat ridges 4 extending along a length of the male member 11. The pleat ridges 4 in the four rows 2 are arranged in eight columns that extend along a width of the male member. Each column has four pleat ridges 4 i.e., a first column, a second column . . . and a last eighth column. The pleat ridges can be broad at bottom and narrow down up to a tip. While, for the purpose of illustration herein, four rows of pleat ridges, it should be obvious to those reading this disclosure that different rows can include different number of pleat ridges, and the number of pleat ridges in the rows can be varied without departing from the scope of the present invention. Provided that the pleat ridges in parallel rows forms columns extending from the front to the rear of the front member.

Referring to FIG. 2 which shows the female member 14 that includes a base plate 16, a front side wall 5, a rear side wall 8, and two side walls 7. The top is open, and a porous filter media sheet can be placed on the top for pleating. The female member can have several upwards projections arranged in rows and columns. FIG. 2 shows four rows running along a length of the female member 14 between the front wall and the rear wall, and two rows form the two side walls, wherein two adjacent projections in the rows form a pleat valley 6. The pleat valley can be of a geometry similar to the geometry of the pleat ridges. The pleat ridges and the pleat valleys can be so arranged such that when the male member 11 is engaged or mounted over the female member, the pleat ridges can be received within the pleat valleys respectively. When engaged, there can be a very small gap between the surfaces of the pleat ridges and pleat valleys, such that the porous media sheet can be sandwiched between the pleat ridges and the pleat valleys. The base plate of male member 11 can rest over the walls of the female member 14 to form the assembly, wherein the assembly can be installed in a housing of the filtration unit. On the rear wall 8 can be seen two round apertures which can be outlet apertures 9 for the filtered air. The air received from the intake aperture 3 can pass through the pleated filter media sandwiched between the male member and the female member, and the filtered air can pass through the two outlet apertures 9. While, for the purpose of illustration herein, two outlet apertures 9 are shown in the rear wall 8, it should be obvious to those reading this disclosure that the shape, size, position, and a number of the outlet apertures can vary without departing from the scope of the present invention.

Figure 3:
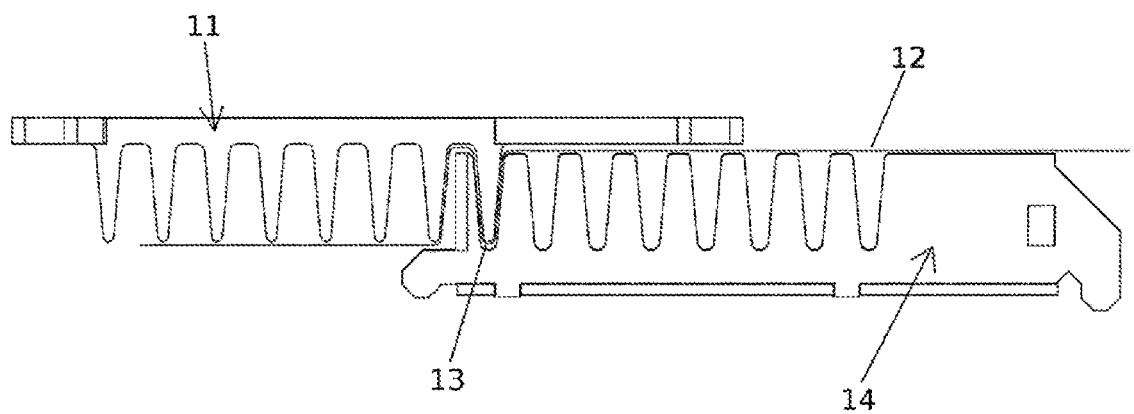
FIG. 3 is an orthographic view showing the male member engaged to the female member for pleating a filter media sheet, according to an exemplary embodiment of the present invention.
Figure 4:
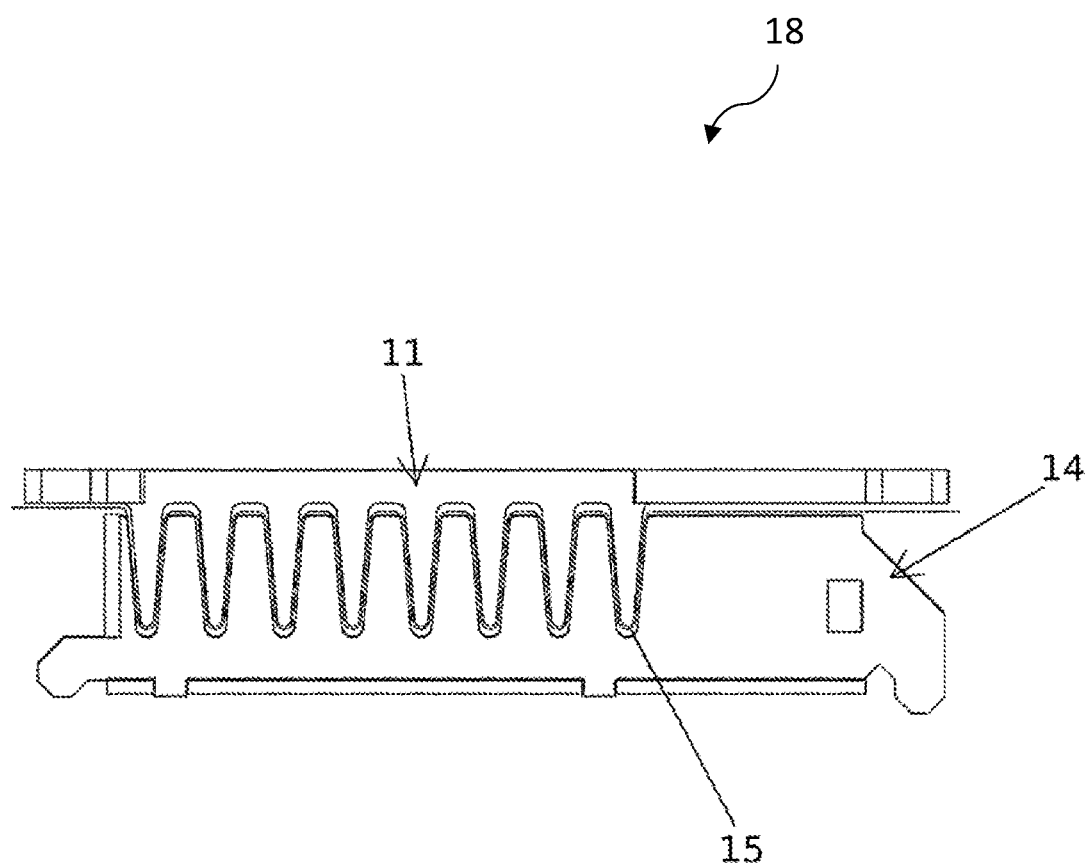
FIG. 4 is an orthographic view of the assembly encasing the pleated filter media, according to an exemplary embodiment of the present invention.

Referring to FIG. 3, which shows the process of pleating the filter media sheet. First a filter media sheet 12 can be placed over the female member and can extend from the front wall 8 to the rear wall 5 and over the rear wall 5. Then the male member can be positioned over the female member such that the last column of pleat ridges can be on top of the first column of the pleat valleys. The first column of the pleat valleys can be adjacent to the front wall 5. Then the male member can be gently pressed over the female member, resulting in the pulling of the porous sheet into the pleat valley by the pleat ridge. Once, the column of pleat ridges is fully received within the column of pleat valleys, a first pleat of the filter media can be formed. Thereafter, the male member can be lifted while the pleat of the filter media can remain with the column of pleat valleys. Thereafter, the last column of pleat ridges can be pushed over the second column of pleat valleys. The second last column of pleat ridges can be simultaneously received within the first column of pleat valleys. This pulls the filter media sheet from the rear wall side of the female member. The same process can be repeated progressively until all the pleats can be formed as shown in FIG. 4 and the first column of pleat ridges is within the first column of pleat valleys. The pleated filter media 12 can be seen sandwiched between the male member 11 and the female member 14. The assembly 18 shown in FIG. 4 can be encased in the housing of a filtration unit. Thus, when the need of replacing the filter media arises, the old pleated filter media can be disposed of and a new pleated filter media can be progressively crafted from a new filter media sheet.

The shapes of pleat valleys 6 and the thinness of the front wall 5 are chosen to accommodate this progressive pleating process. The fully formed pleated filter medium 15 extends beyond the end walls of assembly 18, ensuring that all fluid that reaches the output apertures 9 has passed through the pleated filter medium 15. Also, it can be seen in FIGS. 1 and 2 that the pleat ridges and the pleat valleys adjacent to the front wall and the rear wall are more congested than the remaining pleat forming projections. The pleat-forming projections can have more space between them than the pleat-forming exterior walls of the female member. This allows the pleat forming projections to shape the filter medium while not adding unnecessary friction or force during the pleat forming process. Only the exterior walls of the assembly need to hold the filter medium tightly. Also, the fluid can be forced under pressure into the intake plenum. Input pressure and the output plenum pressure must be higher than that of the space surrounding the assembly, as this pressure differential may be necessary to ensure that no unfiltered air is present within the output plenum.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A pleated filter media assembly comprising:
    a male member comprising:
        a base plate,
        an intake aperture configured for receiving fluid, and
        a plurality of pleat ridges that extends downward, the plurality of pleat ridges is arranged in rows and columns; and
    a female member comprising:
        a front wall and a rear wall,
        a plurality of projections extends upwards and are arranged in rows and columns, wherein the projections rows run between the front wall and the rear wall, wherein two adjacent projections of the plurality of projections in the rows form a plurality of pleat valleys, wherein the plurality of pleat ridges and the plurality of pleat valleys are so arranged such that when the male member is mounted over the female member, the plurality of pleat ridges are received within the plurality of pleat valleys respectively, and
        an output aperture for the fluid to pass through,
        wherein the pleated filter media assembly comprises two output apertures in the rear wall of the female member.

2. The pleated filter media assembly according to claim 1, wherein the pleated filter media assembly further comprises a filter media sheet sandwiched between the plurality of pleat valleys and the plurality of pleat ridges.

3. The pleated filter media assembly according to claim 1, wherein the intake aperture is in the base plate.

4. The pleated filter media assembly according to claim 1, wherein the pleated filter media assembly is configured to be installed in a housing of an air filtration unit.

5. The pleated filter media assembly according to claim 1, wherein two rows of projections of the plurality of projections form two side walls of the female member.

6. The pleated filter media assembly according to claim 1, wherein the plurality of pleat ridges comprises thirty-two pleat ridges arranged in four rows and eight columns.

7. A filtration unit comprising a pleated filter media assembly, the pleated filter media assembly comprising:
    a male member comprising:
        a base plate,
        an intake aperture configured for receiving fluid, and
        a plurality of pleat ridges that extends downward, the plurality of pleat ridges is arranged in rows and columns; and
    a female member comprising:
        a front wall and a rear wall,
        a plurality of projections extends upwards and are arranged in rows and columns, wherein the projections rows run between the front wall and the rear wall, wherein two adjacent projections of the plurality of projections in the rows form a plurality of pleat valleys, wherein the plurality of pleat ridges and the plurality of pleat valleys are so arranged such that when the male member is mounted over the female member, the plurality of pleat ridges are received within the plurality of pleat valleys respectively, and
        an output aperture for the fluid to pass through, wherein the intake aperture is in the base plate,
        wherein the intake aperture is in the base plate and the output aperture is in the rear wall of the female member.

8. The filtration unit according to claim 7, wherein the pleated filter media assembly further comprises a filter media sheet sandwiched between the plurality of pleat valleys and the plurality of pleat ridges.

9. The filtration unit according to claim 8, wherein the filtration unit further comprises:
    a housing encasing the pleated filter media assembly, wherein the pleated filter media assembly is dimensioned to be encased within the housing;
    an intake plenum in fluid communication with the intake aperture; and
    an output plenum in fluid communication with the output aperture.

10. The filtration unit according to claim 7, wherein two rows of projections of the plurality of projections form two side walls of the female member.

11. The filtration unit according to claim 7, wherein the plurality of pleat ridges comprises thirty-two pleat ridges arranged in four rows and eight columns.

* * * * *